United States Patent
Dell et al.

(10) Patent No.: US 6,349,390 B1
(45) Date of Patent: Feb. 19, 2002

(54) ON-BOARD SCRUBBING OF SOFT ERRORS MEMORY MODULE

(75) Inventors: Timothy J. Dell, Colchester; Bruce G. Hazelzet; Mark W. Kellogg, both of Essex Junction, all of VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/224,990

(22) Filed: Jan. 4, 1999

(51) Int. Cl.$^7$ .................................................. G06F 11/10
(52) U.S. Cl. ............................ 714/6; 714/764; 714/719
(58) Field of Search ............................... 714/6, 48, 764, 714/753, 800–802, 773, 766, 719, 763, 805, 758, 807; 711/100, 105; 710/301

(56) References Cited

U.S. PATENT DOCUMENTS

| | | | |
|---|---|---|---|
| 5,450,422 A | | 9/1995 | Dell |
| 5,452,429 A | * | 9/1995 | Fuoco et al. |
| 5,623,506 A | * | 4/1997 | Dell et al. |
| 5,881,072 A | * | 3/1999 | Dell |
| 6,185,718 B1 | * | 2/2001 | Dell et al. |

* cited by examiner

*Primary Examiner*—Gopal C. Ray
(74) *Attorney, Agent, or Firm*—William N. Hogg

(57) ABSTRACT

A memory module for attachment to a computer system having a memory bus and a method of using the memory module for error correction by scrubbing soft errors on-board the module is provided. The module includes a printed circuit card with memory storage chips on the card to store data bits and associated ECC check bits. Tabs are provided on the circuit card to couple the card to the memory bus of the computer system. Logic circuitry selectively operatively connects and disconnects the memory chip and the memory bus. A signal processor is connected in circuit relationship with the memory chips. The logic circuitry selectively permits the signal processor to read the stored data bits and associated check bits from the memory chips, recalculate the check bits from the read stored data bits, compare the recalculated check bits with the stored check bits, correct all at least one bit errors in the store data bits and stored associated check bits and re-store the correct data bits and associated check bits in the memory chips. When the memory chips and the memory bus are disconnected, single bit soft errors occurring during storage of the data bits and check bits are corrected periodically before the data is read from the memory chips to the data bus on a read operation.

29 Claims, 2 Drawing Sheets

ON-BOARD SCRUBBING OF SOFT ERRORS MEMORY MODULE

BACKGROUND OF THE INVENTION

1. Field of the Invention

This invention relates generally to error correction of data stored in a computer memory module and especially to error correction on memory modules for correcting soft errors, and more particularly to the use of digital processing elements on memory modules to control scrubbing of soft errors in memory between read/write cycles of the CPU from/to the memory module.

2. Background Information

The use of error correction code (ECC) in systems is becoming more and more prevalent in computers as the size of memory and its sensitivity to errors increases. Error correction is accomplished by using an error correction code which generates check bits from the data written to memory and stores the check bits together with the data bits in memory. When the data bits and check bits are read from memory a new set of check bits is generated from the stored data bits and a comparison is made between the newly generated check bits and the stored check bits. For a single error correct (SEC) ECC, if any single bit errors are detected the error is corrected and in most cases all double bit errors can be detected but not corrected by the ECC algorithm. (Indeed some error correction code algorithms can correct any two or more bit errors, but single bit error correction is much more prevalent.) Moreover, add-on memory cards such as SIMMs or DIMMs are often structured so that they are capable of storing the data bits together with the check bits, but in many instances where error correction is not native to the CPU, error correction capabilities are provided on-board the SIMM or DIMM so that a computer which does not have native error correction nevertheless can have SIMM or DIMM add on cards which perform error correction of the data stored thereon.

In many cases the only time that error correction of the stored data bits takes place is when a read cycle is performed by the CPU. During the read cycle, the error correction code is utilized to correct single bit errors.

This technique while generally effective does have certain drawbacks. These drawbacks are encountered particularly when the memory modules may develop hard errors which align with soft errors which have been induced in memory. A hard error is a permanent error that cannot be fixed. A soft error is a temporary error which is fixed as soon as new data is written into the affected storage location. Hard errors result from manufacturing defects which manifest themselves some time after many cycles of operation in some function of the DRAM storage devices. Thus, memory which tests good after manufacturing may develop hard errors after installation and many cycles of operation. Such errors appear on every read cycle of a particular bit value, sometimes at many addresses. Such errors, as long as they are single bit errors, can be corrected on each read cycle to the affected address(es). However, if during storage a soft error should occur in some data bit or check bit and subsequently a hard error manifests itself which is aligned with the soft error, the result is a two bit error which in many cases cannot be corrected and thus causes an error signal. (Soft errors can occur due to several causes, one of which is stray radiation which can cause a bit to "flip".) Thus the combination of soft errors occurring, which are random errors which can be corrected, aligned with hard errors, will cause the computer to either crash or malfunction.

In order to overcome this problem it is possible to "scrub" the data stored in the DRAMs periodically, i.e. the soft errors can be corrected periodically and thus if subsequent hard errors occur, these will be only one bit errors which can be subsequently corrected on a read cycle since the soft errors have been "scrubbed" or "fixed" and thus can not align with the hard errors. However, while some error correction native to computers or CPU's have such scrubbing capability, this is not the case with all CPU native error correction.

SUMMARY OF THE INVENTION

According to the present invention, a memory module for attachment to a computer system having a memory bus and a method of using a memory module for error correction by scrubbing soft errors on-board the module is provided. The module includes a printed circuit card with memory storage chips on the card to store data bits and associated ECC check bits. Tabs are provided on the circuit card to connect the circuit card to the system memory bus. Logic circuitry is provided to selectively operatively connect and disconnect the memory chip and the memory bus. A signal processing element is connected in circuit relationship with the memory chips. The logic circuitry will selectively permit the signal processor to read the stored data bits and associated check bits from the memory chips, recalculate the check bits from the read stored data bits, compare the recalculated check bits with the stored check bits, correct all one bit errors in the stored data bits and stored associated check bits and re-store the correct data bits and associated check bits in the memory chips. When the memory chips and the memory bus are disconnected, this will allow single bit soft errors occurring during storage of the data bits and check bits to be corrected periodically before the data is read from the memory chips to the data bus on a read operation and thus reduce the chance of hard errors occurring and aligning with soft errors.

DESCRIPTION OF THE PREFERRED EMBODIMENT(S)

Figure 1:
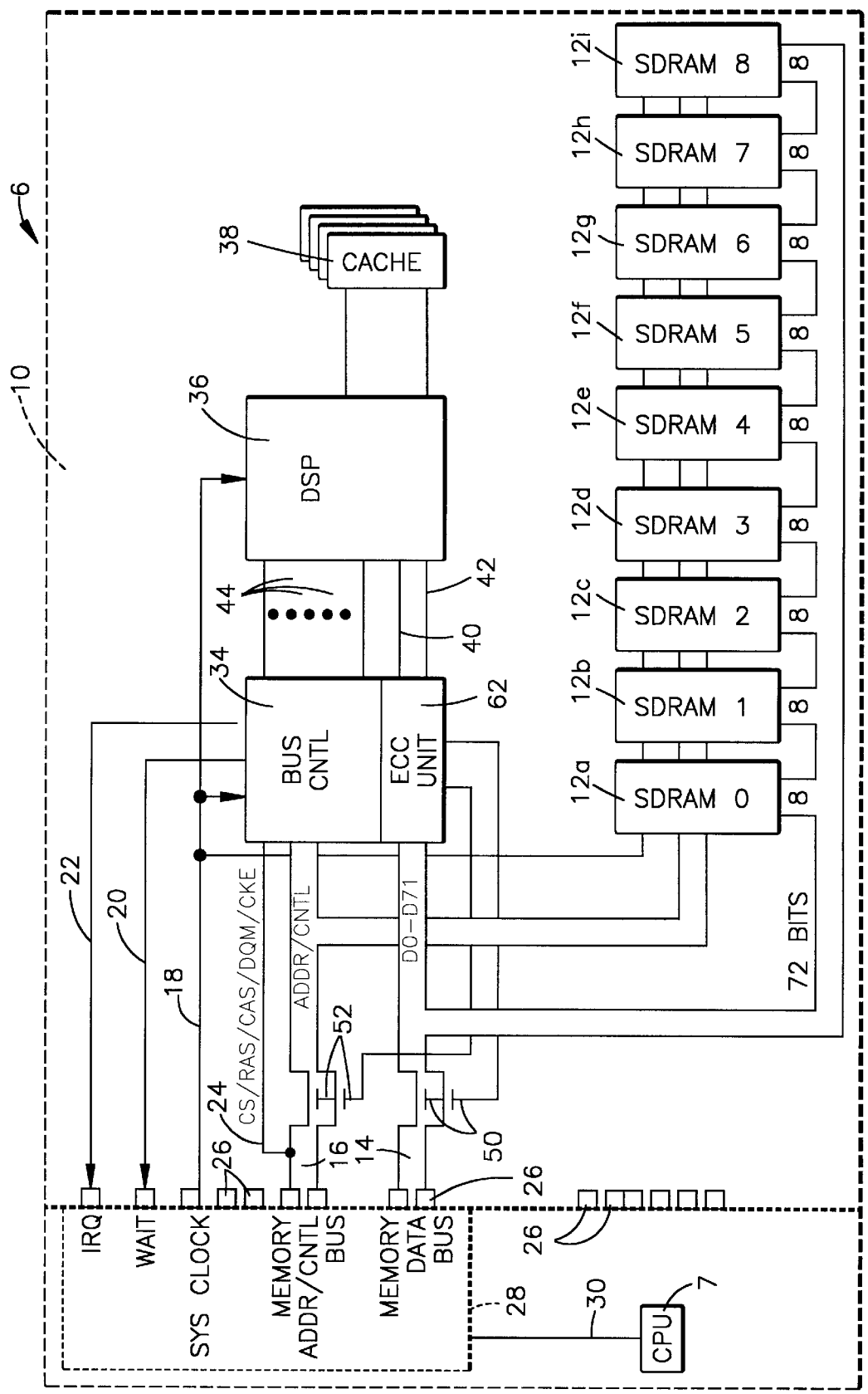
FIG. 1 is a somewhat schematic view of a memory module having error correction capabilities thereon under the control of a digital processing element, connected to the memory controller of a host CPU or computer.

Referring now to the drawings and for the present to FIG. 1, one embodiment of the present invention is shown as embodied in a personal computer 6 having a CPU 7 that has ECC (i.e. error correction code) capabilities within the CPU 7 (or on the system bus) without the capability of scrubbing data stored on the memory modules. A memory module 8 includes a printed circuit card 10 having a plurality of synchronous DRAMs (SDRAMs) 12a through 12i. (It is to be understood that the number of the SDRAMs could be more or less, and that they can be arranged in one or more banks, as is well known in the art.) The synchronous DRAMs 12a–12i, which are conventional SDRAMs, are configured and arranged to store both data bits and check bits written to them by the computer system. The circuit card 10 includes a memory data bus 14, a memory address/control bus 16, a system clock line 18, a wait line 20 and an interrupt request line 22. Memory data bus 14, memory address/control bus 16, system clock 18, wait line 20 and interrupt request line 22 are all connected to I/O connectors sometimes referred to as pins 26. A command control bus 24 is also provided, which picks off certain of the unidirectional signals on memory address and central bus 16 and directly connects to the bus controller 34.. The I/O connectors 26 provide an interface to a system memory controller 28, connected by system bus 30 to the CPU 7.

The memory card 10 also has a bus controller 34 which is connected to the memory data bus 14, the memory address/control bus 16, the system clock 18, the wait line 20, and the interrupt request line 22 and the command control bus 24. The bus controller 34 is connected to a signal processing element 36 which in the preferred embodiment is a digital signal processor (DSP). A particularly useful DSP is any one of the TMS 320C54X family manufactured by Texas Instruments, Inc. This particular DSP family includes an external cache memory 38. The bus controller 34 and DSP 36 are interconnected by a chip address bus 40, a chip data bus 42 and control lines 44 that pass various control signals between the bus controller 34 and the DSP 36. This type of connection is well known in the art.

The memory data bus 14 has FET switches 50 therein. (It is to be understood that the memory data bus 14 is comprised of multiple lines, one for each bit and there is an FET 50 for each bit line.) The memory data bus 14 may be an 8 bit bus, a 16 bit bus, a 32 bit bus, or a 64 bit bus, and indeed any size data bus which includes whatever number of data lines are required. Also there are FET switches 52 in the system address/control bus 16. The system clock line 18 is also connected to the DSP 36 in the preferred embodiment; however, it is to be understood that a separate clock could be provided for the DSP if different timing is used on the card from the timing used in the CPU. However, the preferred embodiment for most instances is to use the system clock for clocking the functions and signals on the memory module.

The bus control Controller 34 includes an error correction control unit (ECC) 62. (Of course the DSP 36 and bus controller 34 can and usually do perform other functions or tasks beside error correction, these functions including tasks assigned to the DSP by the CPU via the system memory controller 28.) The ECC unit 62 is shown as a part of bus controller 34, however, it could be a part of the DSP or some combination of the two. The ECC unit 62 is conventional in design and can be structured for example as disclosed in commonly assigned U.S. Pat. No. 5,450,422 dated Sep. 12, 1995 which is incorporated herein by reference. However, this is just one example of an ECC unit, and any other type of ECC unit could be employed. The description in the U.S. Pat. No. 5,450,422 is for an ECC unit on an 8 bit bus using a 4 bit error correction code; but, it is to be understood that this is not limiting and the error correction code unit 62 can both generate and correct data on bus widths of 8 bits, 16 bits, 32 bits, 64 bits or more with the appropriate number of error correction code bits. Indeed, the card 10 of the present invention shows a structure for 64 data bits and 8 check bits. Moreover, the error correction code disclosed in said U.S. Pat. No. 5,450,422 corrects all single bit errors and some double bit errors. However, it is to be understood that other correction code schemes could be used including those that can correct all double bit errors and not just flag them. However, for the present invention, ECC which will correct all single bit errors, some double bit errors and flag some other errors which are uncorrectable is used.

Figure 2:
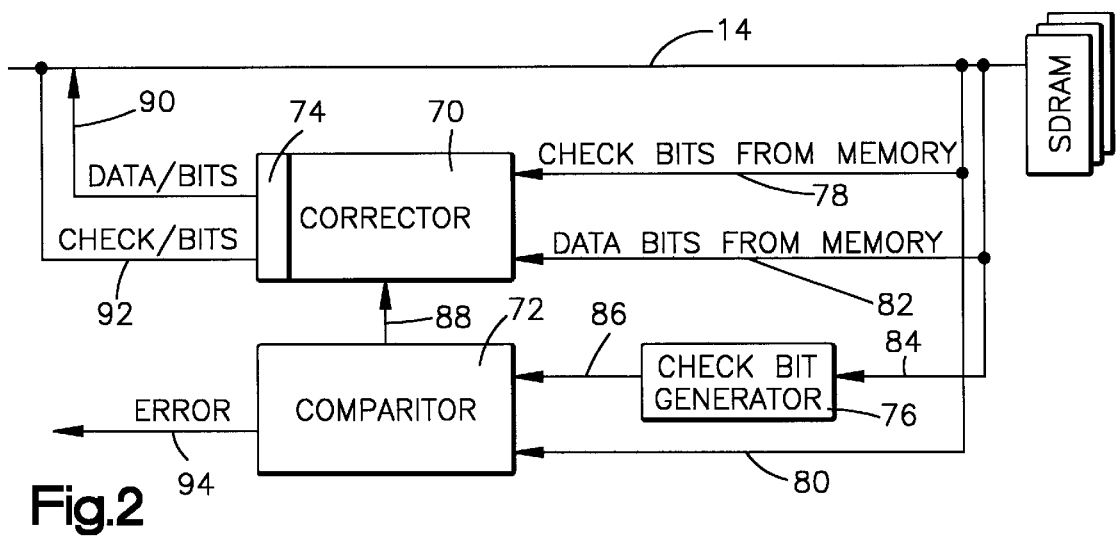
FIG. 2 is a block diagram showing the operation of the error correction circuitry on the memory module.

The functional operation of the ECC unit 62 is shown in FIG. 2. This ECC unit includes a corrector 70, a comparitor 72 with a latch or register 74 contained in the corrector 70.

Bus 78 provides check bit inputs of memory data bits stored on the SDRAMs 12a–12i to the corrector 70, bus 80 provides check bit input from memory of check bits to the comparitor 72, bus 82 provides data bit input from memory to the corrector 70, bus 84 provides data bit input from memory to the check bit generator 76, and bus 86 provides the check bit input for regenerated check bits from the check bit generator 76 to the comparitor 72. Comparitor 72 compares the stored check bits received on bus 80 with the regenerated check bits generated as input to the comparitor 72 on bus 86. A correction signal is generated on bus 88 from the comparitor 72 to the corrector 70. If any one check bit or any one data bit is wrong the corrector 70 will correct (i.e. "flip") that one or single data bit or check bit. Also certain double bit errors can be corrected as disclosed in U.S. Pat. No. 5,450,422. Corrected data bits are output on correct data bit bus 90 to the memory bus 14 for re-storing in the memory and correct check bits are outputted from the corrector 70 on the check bit bus 92 to the memory bus 14, also to be re-stored in memory. Error line 94 is provided from the comparitor on which is generated an error signal if uncorrectable error is detected by the comparitor. This error signal can be utilized in any fashion, such has indicating any uncorrectable errors to the CPU, or shutting down the operation of the CPU or any other well known use.

Error scrubbing of the check bits and data bits by the ECC unit 62 operates as follows and as is depicted in the flow chart of FIG. 3. The bus controller 34 monitors the activity on the system memory controller 28 and when the memory controller 28 is not requesting either a read or write or other operation to or from the memory module 8, the bus controller 34 causes the FETs 50 and 52 to open, thus disconnecting or decoupling the memory data bus 14 and memory address/control bus 16 from the SDRAMs. This allows the DSP 36 to take control of the operation of the module 8. (It is possible that the bus controller 34 or some combination of the bus controller 34 and DSP 36 could take control of the operation of the module 8.) The DSP 36 then causes a read of the data bits and associated check bits from appropriate selected SDRAM 12a–12i at the appropriate addresses which data bits and check bits are to be subject of error correction, and delivers the read check bits and data bits to the corrector 70 on buses 78 and 82. Also the data bits from memory are delivered to the check bit generator 76 on bus 84. Check bit generator 76 recalculates the check bits in a conventional way from the data bits on bus 84 and supplies the recalculated check bits on bus 86 to the comparitor 72. The comparitor 72 compares the newly generated check bits from the check bit generator 76 with the stored check bits delivered on bus 80 and if they match or compare then no action need be taken. However, if there is a mismatch of any one or single data bit or check bit, the comparitor will send a signal on bus 88 to the corrector 70 which will correct or "flip" the improper data bit or check bit and output the correct data bits on bus 90 and correct check bits on bus 92.

As indicated before, the particular algorithm shown in U.S. Pat. No. 5,450,422 will correct all single bit errors and some double bit errors. Thus all single bit errors will be corrected and some double bit errors will be corrected and the uncorrectable double bit errors will be flagged on the error line 94. However, as indicated above, it is to be understood that other algorithms could be used and if the algorithm permits correction of all double bit errors, then all double bit errors would be corrected and the corrected data bits and check bits put onto buses 90 and 92 and returned to memory.

The latch 74 is provided so that the corrected data bits and check bits can be stored after they have been generated so that the data bus 14 can be used for both read and write operation between the memory and the corrector 70. The DSP 36 thus can be used to control both the write mode and the read mode to and from the SDRAMs 12a–12i and in the specific SDRAM a given address can be both the source of the read data and the target for the re-write of the data bits and check bits. Such bidirectional use of the bus 14 is well known in the art and need not be described further.

As was indicated above, the error correction of the present invention is accomplished when the memory module is not being addressed for either a read or write function or other function by the CPU memory controller 28. Thus the FETs 50 and 52 are in an open position when the error correction of this present invention or any other function of the DSP on memory is taking place and a wait signal is generated by the bus controller 34. If the CPU wishes to access the memory module and a wait signal is not present FET's 50 and 52 are either closed, or will be closed allowing the system memory controller 38 to address the SDRAM's for conventional read/write operation. If however, the DSP and bus controller are engaged in data scrubbing operation or other operation or memory, the wait signal is delivered to the system memory controller 28 on the wait line 20.

If a wait signal is received, the memory controller will hold off its pending operation for a predetermined time or until the wait signal is removed. Hence, at any time when the computer 6 or CPU 7 does not need to address the particular memory module 8, the memory data bus 14 and the memory address/control bus 16 can be isolated from the system memory controller 28; and the bus controller 34 under the control of the DSP 36 will conduct error correction on the memory in the SDRAMs, thus scrubbing the DRAMs of any soft errors that may have occurred since the previous scrubbing operation or since the writing of new data to the SDRAMs. It should be noted that soft error scrubbing need only take place occasionally, and not continuously, and thus the bus controller 34 can be programmed to initiate the scrubbing on a preselected time basis, e.g. once every 12 hours, or 3 days, etc.

As indicated earlier, the scrubbing operation is particularly important so that soft errors can be detected and corrected in the event that a subsequent hard error occurs that would otherwise be aligned with the soft error, so the system will be able to correct this hard error on a read operation even though the correction code is for only single bit errors. This is because the occurrence of a double bit error has been prevented by the correction of the soft error which might otherwise have occurred aligned with the hard error which would present a double bit error to the bus controller which the code as disclosed in U.S. Pat. No. 5,450,422 would not correct. As indicated earlier, if the algorithm corrects double bit errors, this invention would still be valuable in that if two one bit hard error occur in alignment with each other and in alignment with a soft error such soft error would be removed; or if a hard error would occur with two soft errors all in alignment, the soft errors would be removed before the hard error occurred, thus allowing the correction to take place.

The bus controller 34 monitors the memory address/control bus 16 via command and control bus 24. If the CPU is not accessing the SDRAMs 12a–12i and the FETs 50 and 52 are opened scrubbing may occur if it is time to do so. . If the command and control bus 24 indicate the memory controller 28 is accessing the DRAMs, the controller can wait until the task is completed. If CPU is not accessing the DRAMs 12a–12i, but the FET's 50 and 52 are still closed then the bus controller 34 will first open the FET's and may then proceed with scrubbing if it is time to do so. If immediate access by the DSP 36 is required, such as when it is acting to control a device, it will impress an interrupt signal on IRQ line 22, and the memory controller 28 will relinquish control when it finishes its task.

Figure 3:
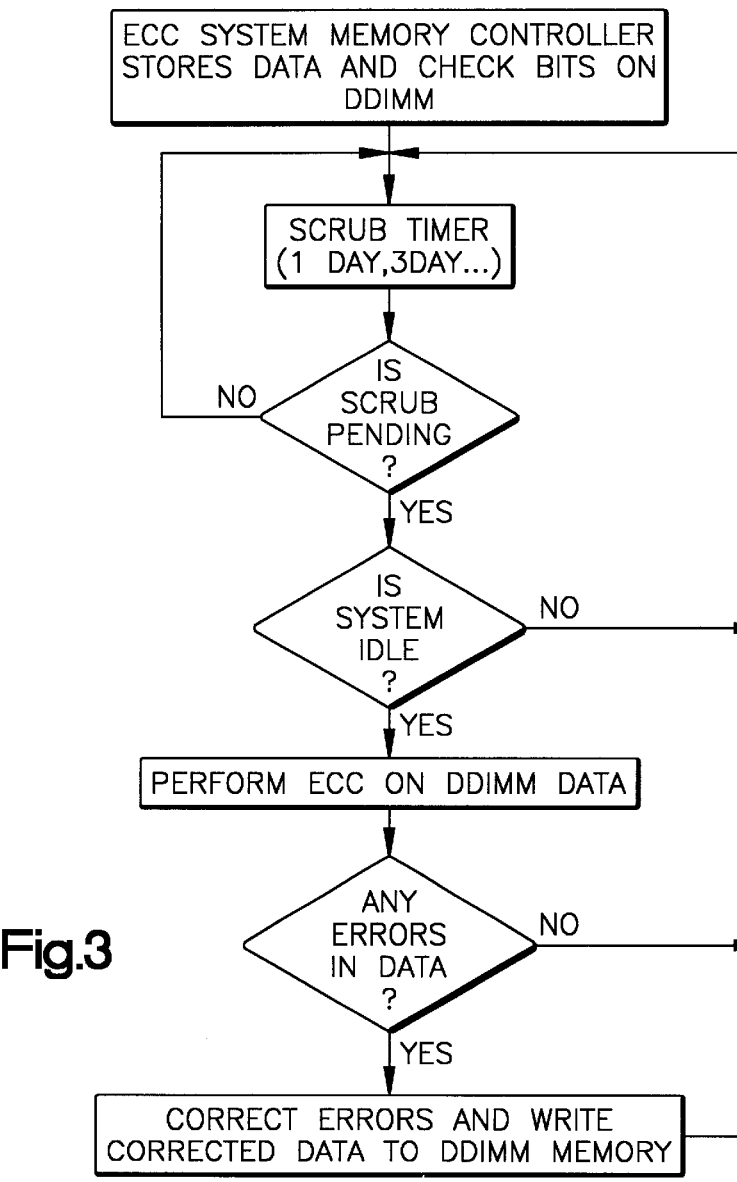
FIG. 3 is a flow diagram showing the operation of the error correction to scrub soft errors when the system is not performing a read/write operation from/to the module.

To summarize the operation as shown in FIG. 3, the card stores data bits and check bits in the memory. The bus controller 34 continuously monitors to see if the system is accessing the memory on this module. If it is, the system is engaged in a read/write operation from/to the card, and the bus controller 34 continues to monitor the system, i.e. the memory controller 28, until the system is idle. When the system is idle, and a scrub operation is pending, a signal is provided which opens the FETs and allows the ECC unit 62 under the control of the DSP 36 to perform error correction on the stored data (or any other operation assigned to the DSP). If there are any errors in the data bits or check bits, the errors that can be corrected are corrected and written as correct data and check bits to the memory. If no errors need to be corrected, the bus controller 34 goes back and determine that a memory request was attempted by the memory controller. If yes, and a scrub operation or other operation is pending, it may perform another ECC operation (or other operation) and continues to perform ECC operations (or other operation) until all pending scrub operations or other operations are complete or a system access attempt is detected. In the latter case the bus controller turns the operation of the system over upon completion of the current operation, to the system memory controller 28 and FETs 50 and 52 are closed. These remain closed until the system memory controller 28 has not requested any access to the memory module in which case the FETs 50 are again opened. If an error scrubbing cycle is pending, FETs 52 are also opened to permit the scrubbing operation to occur. It should be noted that the bus controller 34 must log the current state of the memory as well as the "scrub" address range, and wash through all the addresses and return the memory to the previous system induced state when the scrubbing is done or when the scrubbing operation has been interrupted.

The invention has been described as it functions with error correction native to the computer system 6. However, it is possible to utilize this particular invention on a system that does not have ECC native thereto. In such a case suitable circuitry is provided so that the ECC unit 62 receives the data bits from the data system, generates and stores the check bits as well as storing the data bits received from the system. The ECC unit also will read the data and check bits on a read operation and correct those correctable errors, just as a system native to the CPU would do. In addition to this, the same ECC unit would be utilized to scrub for soft errors has been described.

Accordingly, the preferred embodiments of the present invention have been described. With the foregoing description in mind, however, it is understood that this description is made only by way or example, that the invention is not limited to the particular embodiments described herein, and that various rearrangements, modifications, and substitutions may be implemented without departing from the true spirit of the invention as hereinafter claimed.

What is claimed:

1. A memory module for attachment to a computer system having a memory bus comprising;

a printed circuit card, memory storage chips on said card to store data bits and associated ECC check bits, tabs on said circuit card to couple the card and the memory bus, logic circuitry to selectively operatively connect and disconnect the memory chips and the memory bus, a signal processing element connected in circuit relationship with said memory chips, logic circuitry to selectively permit said signal processing element to read the stored data bits and associated check bits from the memory chips, recalculate the check bits from the read stored data bits, compare the recalculated check bits with the stored check bits, correct all one bit errors in the stored data bits and stored associated check bits, and re-store the correct data bits and associated check bits in the memory chips when said memory chips and said memory bus are disconnected, whereby at least single bit soft errors occurring during storage of data bits and check bits can be corrected before that data is read from the memory chips to the memory bus.

2. The invention as defined in claim 1 wherein said signal processing element is a digital signal processor.

3. The invention as defined in claim 1 wherein said memory storage chips are SDRAMs.

4. The invention as defined in claim 1 wherein said memory module includes storage for check bits generated off the module.

5. The invention as defined in claim 1 wherein said module includes a chip data bus and a chip check bit bus for data bits and check bits.

6. The invention as defined in claim 5 further including a register to store data bits and check bits.

7. The invention as defined in claim 1 further characterized by said logic circuitry to operably connect and disconnect the memory chips and memory bus include switches in said memory bus.

8. The invention as defined in claim 7 wherein said switches include FET's.

9. The invention as defined in claim 1 wherein said logic circuitry includes circuitry to generate a wait signal to the memory bus when said logic circuitry is performing error correction.

10. The invention as defined in claim 1 wherein said logic circuitry includes interrupt request circuitry.

11. In combination a computer having a memory bus and a memory module;

a printed circuit card mounted on said computer comprising, memory storage chips on said card to store data bits and associated ECC check bits, tabs on said circuit card coupling the card and the memory bus, logic circuitry to selectively operatively connect and disconnect the memory chips and the memory bus, a signal processing element on said card connected in circuit relationship with said memory chips, logic circuitry on said card to selectively permit said signal processing element to read the stored data bits and associated check bits from the memory chips, recalculate the check bits from the read stored data bits, compare the recalculated check bits with the stored check bits, correct all one bit errors in the stored data bits and stored associated check bits, and re-store the correct data bits and associated check bits in the memory chips when said memory chips and said memory bus are disconnected, whereby single bit soft errors occurring during storage of data bits and check bits can be corrected before that data is read from the memory chips to the memory bus.

12. The invention as defined in claim 11 wherein said signal processing element is a digital signal processor.

13. The invention as defined in claim 11 wherein said memory storage chips are SDRAMs.

14. The invention as defined in claim 11 wherein said memory module includes storage for check bits generated off the module.

15. The invention as defined in claim 11 wherein said module includes a chip data bus and a chip check bit bus for data bits and check bits.

16. The invention as defined in claim 15 further including a register on said card to store data bits and check bits.

17. The invention as defined in claim 11 further characterized by said logic circuitry to operably connect and disconnect the memory chips and memory bus include switches in said memory bus.

18. The invention as defined in claim 17 wherein said switches include FET's.

19. The invention as defined in claim 1 wherein said logic circuitry includes circuitry to generate a wait signal to the memory bus when said logic circuitry is performing error correction.

20. The invention as defined in claim 11 wherein said logic circuitry includes interrupt request circuitry.

21. A method of correcting errors on a printed circuit card in a computer system having a memory bus between read/write operations to the printed circuit card, wherein said printed circuit card includes;

memory storage chips thereon to store data bits and associated ECC check bits, tabs thereon coupling the card and the memory bus, electrical circuitry to selectively operatively connect and disconnect the memory chips and the memory bus, a processing element thereon connected in circuit relationship with said memory chips; said method comprising the steps of, storing data bits and associated check bits in said memory storage chips during a write operation to the printed circuit card, selectively permitting said processing element to read the stored data bits and associated check bits from the memory chips between read/write operations from/to said printed circuit card, recalculating the check bits from the read stored data bits, comparing the recalculated check bits with the stored check bits, correcting all one bit errors in the stored data bits and stored associated check bits, and re-storing the correct data bits and associated check bits in the memory chips, whereby single bit soft errors occurring during storage of data bits and check bits are corrected before that data is read from the memory chips to the memory bus.

22. The invention as defined in claim 21 wherein said processing element is a digital signal processor.

23. The invention as defined in claim 21 wherein said memory storage chips are SDRAMs.

24. The invention as defined in claim 21 wherein said check bits are generated in the computer for storage in the storage chips.

25. The invention as defined in claim 21 further including temporarily storing data bits and check bits in a register during the cycle or registering check bits.

26. The invention as defined in claim 21 further characterized by said digital circuitry to operably connect and disconnect the memory chips and memory bus includes switches in said memory bus.

27. The invention as defined in claim 26 wherein said switches include FET's.

28. The invention as defined in claim 21 wherein said logic circuitry includes circuitry to generate a wait signal to the memory bus when said logic circuitry is performing error correction.

29. The invention as defined in claim 21 wherein said logic circuitry includes interrupt request circuitry.

* * * * *